United States Patent Office 3,018,296
Patented Jan. 23, 1962

3,018,296
PROCESS FOR THE PURIFICATION OF
3-KETO-Δ¹-STEROIDS
Paul D. Klimstra, Skokie, Ill., assignor to G. D. Searle
& Co., Chicago, Ill., a corporation of Delaware
No Drawing. Filed Oct. 25, 1960, Ser. No. 64,738
7 Claims. (Cl. 260—397.3)

The present invention is concerned with a novel process for the purification of 3-keto-Δ¹-steroids. These compounds are prepared by a two-step process, involving first bromination of a saturated 3-keto-steroid, then dehydrobromination, as shown by the following partial structural formulae:

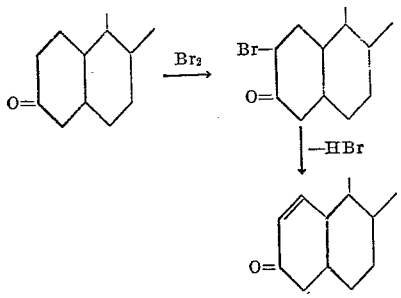

The first step may be conducted by way of one of a variety of standard bromination techniques, and the dehydrobromination can be effected in the presence of known dehydrobrominating agents, for example tertiary amines such as collidine, or inorganic salts such as lithium chloride and lithium carbonate. In the usual conduct of this process, the resulting product is a mixture of components very difficult to separate. This mixture contains unreacted starting material, i.e. the 3-keto-steroid, and also the corresponding 3-keto-Δ⁴-steroid, which arises from the 4-bromo-3-keto-steroid formed during the bromination reaction, and the corresponding 2-bromo-3-keto-Δ¹-steroid, which results from dehydrobromination of the 2,2-dibromo-3-keto-steroid formed in the first step.

The known methods for separation of mixtures of the type described supra are unsatisfactory from the standpoint of one or more of the following factors: time, expense, adaptability to large scale operations, and purity of the product obtained. One of these known methods involves fractional crystallization, but the solubility characteristics of the components of this mixture are so similar that separation by this technique is tedious, time-consuming, and impractical for large scale use. The conversion of the unsaturated components to their dibromo derivatives followed by fractional crystallization of the resulting mixture is also unsatisfactory for the same reasons. A third technique, that of chromatography, results in poor separation due to the closely-related adsorption characteristics of the 3-keto-Δ¹- and 3-keto-Δ⁴-compounds. In addition, of course, chromatography is time-consuming and is limited to small scale operations.

In contrast to those processes described supra, a novel, inexpensive, rapid, and commercially feasible process has been found, which depends for its success upon the observation that a 3-keto-steroid is considerably more reactive toward bisulfite ions than is its Δ¹-derivative. Thus, by treating the mixture with a source of bisulfite ions in an aqueous mixture at ordinary temperature, the 3-keto-steroid is selectively converted to its water-soluble bisulfite addition product, as shown below:

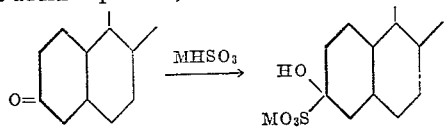

wherein M is the metallic ion of the inorganic bisulfite source. Extraction of the aqueous mixture then removes the unreacted components, namely the desired 3-keto-Δ¹-steroid together with the corresponding 3-keto-Δ⁴ and 2-bromo-3-keto-Δ¹ steroid. Treatment of the latter mixture at an elevated temperature with an inorganic bisulfite ion source converts the 3-keto-Δ¹-steroid selectively to its bisulfite addition product, which is then separated in the aqueous layer, decomposed by treatment with an inorganic base, and extracted with a suitable solvent to afford the free 3-keto-Δ¹-steroid.

Inorganic salts which provide bisulfite ions in aqueous solution are suitable for use in the instant process. Examples are sodium bisulfite and sodium metabisulfite. The bisulfite addition reaction is carried out in an aqueous organic solvent mixture, in which the organic solvent is water-miscible, inert, and relatively polar. Suitable solvents are methanol, ethanol, acetonitrile, dioxane, and the like. As mentioned previously, the preferred temperature range for conversion of the saturated 3-keto-steroid is that of ordinary temperature, i.e. 15–30°. In this range, the saturated derivative reacts rapidly whereas the Δ¹-derivative remains unaffected. The first step may be effected in a period of time as brief as 2 minutes, but longer times can also be used. Separation of the unreacted components from the aqueous mixture is accomplished by extraction with a suitable inert, water-immiscible organic solvent. Suitable solvents are methylene chloride, benzene, ether, chloroform, carbon tetrachloride, etc. Due to the lesser reactivity of this compound, the conversion of the Δ¹-steroid to its bisulfite addition product is conveniently carried out at temperatures of 40–80°. It has been determined that in this temperature range, the Δ⁴- and 2-bromo-Δ¹-steroids are quite unreactive and will remain intact, unless very long reaction times are used.

The instant process is specifically illustrated by the treatment of 17α-ethyl-17β-hydroxy-5α-androstan-3-one in dimethylformamide with bromine in the presence of hydrobromic acid and p-toluenesulfonic acid, isolation of the crude product, treatment of the latter mixture in dimethylformamide with lithium chloride and lithium carbonate, isolation of the resulting product, which contains 17α-ethyl-17β-hydroxy-5α-androst-1-en-3-one together with 17α-ethyl-17β-hydroxy-5α-androstan-3-one, 17α-ethyl-17β-hydroxyandrost-4-en-3-one, and 2-bromo-17α-ethyl-17β-hydroxy-5α-androst-1-en-3-one, treatment of the latter mixture in methanol with aqueous sodium metabisulfite at room temperature, extraction of this aqueous mixture with methylene chloride, evaporation of the solvent, treatment of the resulting residue in methanol with aqueous sodium metabisulfite at the reflux temperature of the mixture, extraction of this mixture with methylene chloride, isolation of the aqueous layer, treatment of the latter aqueous mixture with sodium hydroxide at the reflux temperature, extraction of this mixture with methylene chloride, and evaporation of the solvent to yield 17α-ethyl-17β-hydroxy-5α-androst-1-en-3-one.

The 3-keto-Δ¹-steroids obtained by the process of this invention are useful as a result of their known pharmacological properties. Those containing a 17-oxygenated androstane nucleus are particularly valuable as a result of their androgenic and anabolic properties while those containing the 17-acetyl side chain are known progestational agents, and those characterized by the ketol side chain

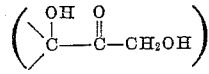

at the 17-position possess adrenocorticoid activity.

The invention will appear in further detail from the following examples, which are given for the purpose of illustration only and are not to be construed as limiting the invention in spirit or in scope. In these examples, quantities are given as parts by weight unless otherwise noted.

*Example 1*

To a stirred mixture of 19.2 parts of 17α-ethyl-17β-hydroxy-5α-androstan-3-one, 1.8 parts of 48% aqueous hydrobromic acid, 0.4 part of p-toluenesulfonic acid, and 333 parts of dimethylformamide is added, over a period of about 2¼ hours, a solution of 10.2 parts of bromine in 95 parts of dimethylformamide. The reaction mixture is poured into ice and water, and the resulting precipitate is collected by filtration, washed successively with dilute aqueous sodium thiosulfate, aqueous sodium carbonate, and water. This solid is extracted with ether, and the organic solution is dried over anhydrous potassium carbonate, then concentrated to afford an oily solid residue.

To a solution of the latter residue in 238 parts of dimethylformamide is added 8 parts of lithium chloride and 9 parts of lithium carbonate, and the resulting mixture is stirred and heated at reflux, in a nitrogen atmosphere, for about 4 hours. The solution is cooled, poured into ice and water, then extracted with ether. The ether extract is washed successively with dilute hydrochloric acid, dilute sodium bicarbonate, and water, dried over a mixture of anhydrous potassium carbonate and activated carbon, then concentrated to dryness to afford a mixture containing 17α-ethyl-17β-hydroxy-5α-androst-1-en-3-one, 17α-ethyl-17β-hydroxy-5α-androstan-3-one, 17α-ethyl-17β-hydroxyandrost-4-en-3-one, and 2-bromo-17α-ethyl-17β-hydroxy-5α-androst-1-en-3-one.

To a solution of 14 parts of the latter crude mixture in 200 parts of methanol is added a solution of 40 parts of sodium metabisulfite in 210 parts of water, and the resulting mixture is stirred for about 3 minutes, then extracted with methylene chloride. This extract is concentrated to dryness to afford a mixture comprising 17α-ethyl-17β-hydroxy-5α-androst-1-en-3-one, 17α-ethyl-17β-hydroxyandrost-4-en-3-one, and 2-bromo-17α-ethyl-17β-hydroxy-5α-androst-1-en-3-one. To the aqueous layer is added dilute aqueous sodium hydroxide, and the mixture is heated on the steam bath for about 5 minutes, then extracted with methylene chloride. The organic extract is washed with water, dried over anhydrous potassium carbonate and concentrated to afford 17α-ethyl-17β-hydroxy-5α-androstan-3-one.

The aforementioned crude mixture of 17α-ethyl-17β-hydroxy-5α-androst-1-en-3-one, 17α-ethyl-17β-hydroxyandrost-4-en-3-one, and 2-bromo-17α-ethyl-17β-hydroxy-androst-1-en-3-one is dissolved in 120 parts of methanol, then treated with a solution of 28 parts of sodium metabisulfite in 110 parts of water. This mixture is heated at reflux for about one hour, diluted with water, cooled, and extracted with methylene chloride. The organic layer is washed with water, dried over anhydrous potassium carbonate, and concentrated to dryness to afford a mixture of 17α-ethyl-17β-hydroxyandrost-4-en-3-one and 2-bromo-17α-ethyl-17β-hydroxy-5α-androst-1-en-3-one. The aqueous layer is treated with a solution of 5 parts of sodium hydroxide in 150 parts of water, and the mixture is heated at reflux for about 15 minutes, cooled, and extracted with methylene chloride. The organic extract is washed with water, dried over anhydrous potassium carbonate, and evaporated to afford pure 17α-ethyl-17β-hydroxy-5α-androst-1-en-3-one, which is characterized by an ultraviolet absorption maximum at about 229.5 millimicrons with a molecular extinction coefficient of about 10,000.

*Example 2*

By substituting an equivalent quantity of 17β-hydroxy-17α-methyl-5α-androstan-3-one, 5α-androstane-3,17-dione, or 17α-ethyl-17β-hydroxy-6β-methyl-5α-androstan-3-one in the process of Example 1, 17β-hydroxy-17α-methyl-5α-androst-1-en-3-one, 5α-androst-1-ene-3,17-dione, and 17α-ethyl-17β-hydroxy-6β-methyl-5α-androst-1-en-3-one, respectively, are obtained. The latter compounds are characterized by an ultraviolet maximum at about 229.5, 230, and 229.5 millimicrons, respectively, with molecular extinction coefficients of 10,268, 10,000, and 9,200, respectively.

*Example 3*

The substitution of an equivalent quantity of 5α-pregnane-3,20-dione or 11β,21-dihydroxy-5α-pregnane-3,20-dione in the process of Example 1 results in 5α-pregn-1-ene-3,20-dione and 11β,21-dihydroxy-5α-pregn-1-ene-3,20-dione, respectively.

What is claimed is:

1. A process for the purification of a compound of the structural formula

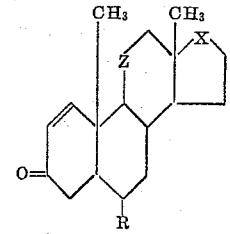

wherein X is selected from the group consisting of

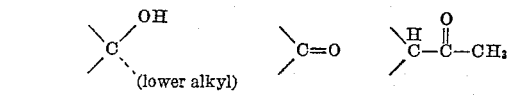

and

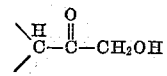

radicals, R is selected from the group consisting of hydrogen and methyl radicals, and Z is selected from the group consisting of methylene and β-hydroxymethylene radicals, the steps which comprise treating a mixture containing that compound together with the corresponding 3-keto-Δ⁴-compound, the corresponding 3-keto- compound, and the corresponding 2-bromo-3-keto-Δ¹-compound, with a source of bisulfite ions in an aqueous polar organic solvent medium at a temperature of 15–30°, extracting the resulting aqueous mixture with a water-immiscible organic solvent, evaporating the organic solvents, treating the resulting residue with a source of bisulfite ions in an aqueous polar organic solvent medium at a temperature of 40–80°, extracting said aqueous mixture with a water-immiscible organic solvent, treating said aqueous mixture with an inorganic base, extracting the resulting mixture with a water-immiscible organic solvent, and concentrating the resulting organic solution to afford the purified compound of the structural formula.

2. The process of claim 1, wherein the mixture consists of a compound of the structural formula

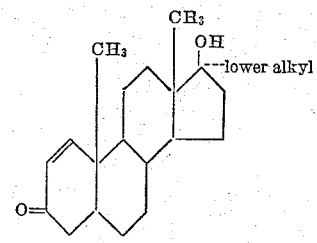

together with the corresponding 3-keto-Δ⁴, 3-keto, and 2-bromo-3-keto-Δ¹ derivatives.

3. The process of claim 1, wherein the mixture consists of 5α-androst-1-ene-3,17-dione together with the corresponding 3-keto-Δ⁴, 3-keto, and 2-bromo-3-keto-Δ¹ derivatives.

4. The process of claim 1, wherein the mixture consists of a compound of the structural formula

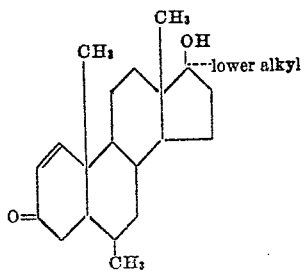

together with the corresponding 3-keto-Δ⁴, 3-keto, and 2-bromo-3-keto-Δ¹ derivatives.

5. The process of claim 1, wherein the mixture consists of 17α-ethyl-17β-hydroxy-5α-androst-1-en-3-one together with the corresponding 3-keto-Δ⁴, 3-keto, and 2-bromo-3-keto-Δ¹ derivatives.

6. The process of claim 1, wherein the mixture consists of 17β-hydroxy-17α-methyl-5α-androst-1-en-3-one together with the corresponding 3-keto-Δ⁴, 3-keto, and 2-bromo-3-keto-Δ¹ derivatives.

7. The process of claim 1, wherein the mixture consists of 17α-ethyl-17β-hydroxy-6β-methylandrost-1-en-3-one together with the corresponding 3-keto-Δ⁴, 3-keto, and 2-bromo-3-keto-Δ¹ derivatives.

No references cited.